US006768876B1

(12) United States Patent
Steiger et al.

(10) Patent No.: US 6,768,876 B1
(45) Date of Patent: Jul. 27, 2004

(54) METHOD AND APPARATUS FOR TRACKING AN OPTICAL COMMUNICATIONS SYSTEM

(75) Inventors: Ronald D. Steiger, Redmond, WA (US); Mark R. Pratt, Seattle, WA (US)

(73) Assignee: Terabeam Corporation, Kirkland, WA (US)

( * ) Notice: Subject to any disclaimer, the term of this patent is extended or adjusted under 35 U.S.C. 154(b) by 566 days.

(21) Appl. No.: 09/627,817

(22) Filed: Jul. 28, 2000

(51) Int. Cl.[7] .............................................. H04B 10/00
(52) U.S. Cl. ....................... 398/156; 398/202; 398/208; 398/209; 398/213; 398/137; 398/122; 398/129; 398/131; 375/316; 375/317; 375/318
(58) Field of Search ................................. 398/202, 208, 398/156, 209, 135, 137, 136, 118, 119, 122, 123, 129, 213, 140; 375/316, 317, 318

(56) References Cited

U.S. PATENT DOCUMENTS

| | | | |
|---|---|---|---|
| 4,868,685 A | | 9/1989 | Ueno |
| 5,142,400 A | * | 8/1992 | Solinsky ...................... 398/156 |
| 5,594,580 A | * | 1/1997 | Sakanaka et al. ........... 398/156 |
| 5,991,062 A | * | 11/1999 | Fischer et al. .............. 398/156 |
| 6,122,084 A | | 9/2000 | Britz et al. |
| 6,304,357 B1 | * | 10/2001 | Ohhata et al. .............. 359/194 |
| 6,335,811 B1 | * | 1/2002 | Sakanaka ................... 359/159 |
| 6,359,715 B1 | | 3/2002 | Imajo |
| 6,483,621 B1 | * | 11/2002 | Adams et al. .............. 359/159 |
| 6,490,070 B1 | * | 12/2002 | Adams et al. .............. 359/156 |
| 6,522,440 B1 | | 2/2003 | Poon et al. |

\* cited by examiner

Primary Examiner—Leslie Pascal
Assistant Examiner—Hanh Phan
(74) Attorney, Agent, or Firm—Blakely Sokoloff Taylor & Zafman LLP

(57) ABSTRACT

A tracking system and method in an optical communications system utilizing an optical communications beam. In one embodiment, the disclosed optical communications system includes a communications receiver circuit and a tracking circuit. The optical communications system generates a communications signal. The tracking system includes a tracking detector having a plurality of regions coupled to a corresponding plurality of tracking channel circuits. Each of the tracking channel circuits includes an optical detector coupled to receive the optical communications beam. The peak-to-peak amplitude modulation in the optical communications beam is measured by substantially reducing or removing a direct current (DC) offset present in the optical communications beam. In one embodiment, after the DC offset is substantially reduced or removed, the signal is then amplified, mixed with the communications signal and then filtered. The filtered signal is one of a plurality of tracking signal outputs, which are input to an alignment circuit. The alignment circuit is used to help maintain the alignment of the optical communications beam between the optical transmitter and receiver of the optical communications system. In one embodiment, each of the plurality of tracking signal outputs are also input into a gain control circuit. The gain control circuit is coupled to generate a gain control signal, which used to control the gain of variable gain amplifiers in the tracking channel circuits.

44 Claims, 7 Drawing Sheets

METHOD AND APPARATUS FOR TRACKING AN OPTICAL COMMUNICATIONS SYSTEM

BACKGROUND OF THE INVENTION

1. Field of the Invention

The present invention relates generally to wireless communications and, more specifically, the present invention relates to optical communications systems.

2. Background Information

With the increasing popularity of wide area networks (WANs), such as the Internet and/or the World Wide Web, network growth and traffic has exploded in recent years. Network users continue to demand faster networks and more access for both businesses and consumers. As network demands continue to increase, existing network infrastructures and technologies are reaching their limits.

An alternative to present day hardwired or fiber network solutions is the use of wireless optical communications. Wireless optical communications utilize point-to-point communications through free space and therefore do not require the routing of cables or fibers between locations. Thus, wireless optical communications are also known as free space or atmospheric optical communications. For instance, in a free space optical communication system, a beam of light is directed through free space from a transmitter at a first location to a receiver at a second location. Data or information is encoded into the beam of light, and therefore, the information is transmitted through free space from the first location to the second location.

An important aspect of a free space optical communications system is tracking. In particular, it is important that the optical communications beam (e.g. laser beam) is aimed properly from the transmitter at the first location and that the receiver at the second location is aligned properly to receive the optical communications beam. For example, assume that a transmitter is mounted on a first building and that a receiver is mounted on a different second building. Assume further that there is a line of sight between the transmitter and receiver. It is important for the transmitter on the first building to be configured to accurately direct or aim the optical communications beam at the receiver on the second building.

Tracking is utilized for maintaining the alignment of the optical communications beam between the transmitter and receiver in various situations or disturbances. Examples of these various situations or disturbances include the swaying of the buildings due to for example windy conditions, vibration of the platforms on which the transmitter and/or receiver are mounted, atmosphere-induced beam steering, etc. If the tracking system is unable to compensate for disturbances, the optical communications beam is no longer properly aimed at the receiver and, consequently, communications between the transmitter and receiver are lost or impaired.

SUMMARY OF THE INVENTION

An apparatus is disclosed in which an optical detector is optically coupled to receive an optical communications beam directed from optics. In one embodiment, an amplifier alternating current (AC) coupled to the optical detector. A mixer circuit is coupled to receive an output of the amplifier and a communications signal. The communications signal is generated by a communications receiver circuit in response to the optical communications beam. The mixer circuit coupled to generate a first single polarity output signal in response to an output of the amplifier and the communications signal to facilitate aligned reception of the optical communications beam by the optics. Additional features and benefits of the present invention will become apparent from the detailed description, figures and claims set forth below.

BRIEF DESCRIPTION OF THE DRAWINGS

The present invention is illustrated by way of example and not limitation in the accompanying figures.

DETAILED DESCRIPTION

Figure 1:
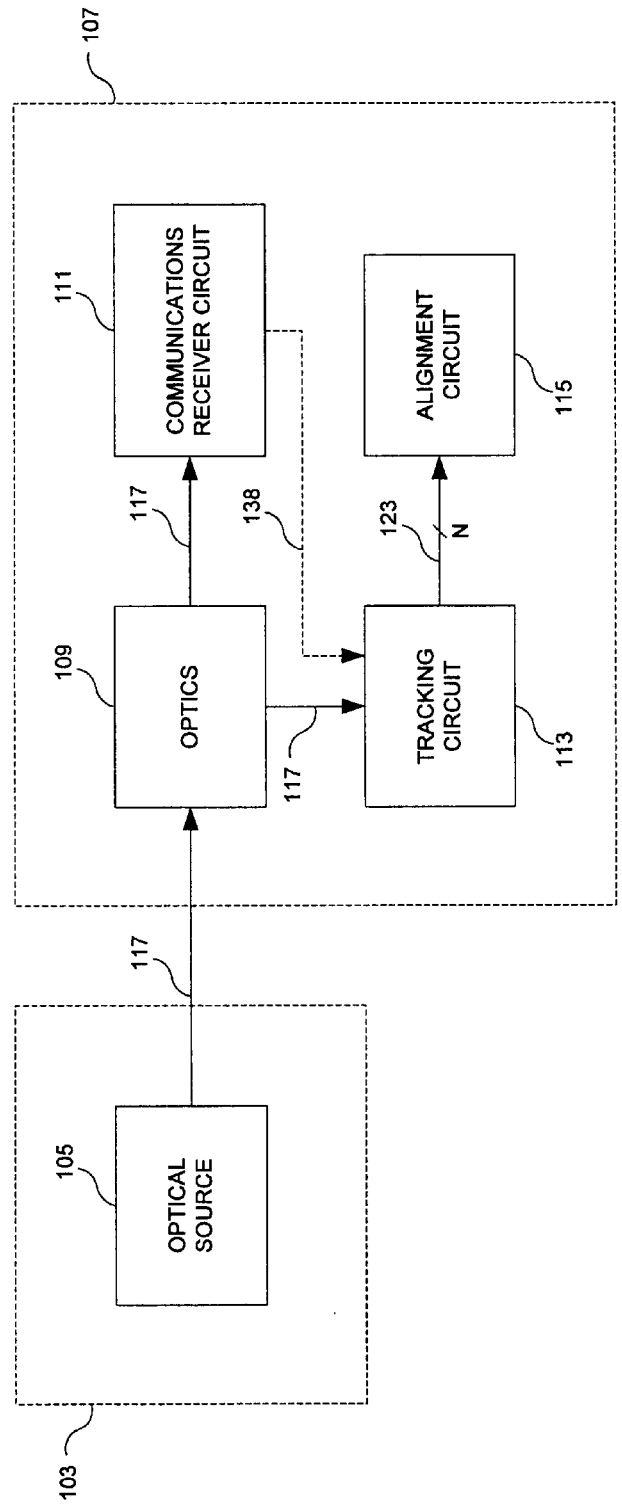
FIG. 1 is a block diagram illustrating one embodiment of an optical communications system in accordance with the teachings of the present invention.

In one aspect of the present invention, methods and apparatuses for tracking an optical beam in a free space optical communications system are disclosed. In the following description, numerous specific details are set forth in order to provide a thorough understanding of the present invention. It will be apparent, however, to one having ordinary skill in the art that the specific detail need not be employed to practice the present invention. In other instances, wellknown materials or methods have not been described in detail in order to avoid obscuring the present invention.

In one example embodiment of the present invention, point to point free space optical communications are provided from a transmitter to a receiver. The transmitter and receiver may be located at the same location or at different locations such as on different buildings within a line of sight of each other. In one embodiment, the line of sight may include reflections off one or more reflective surfaces between the transmitter and receiver in accordance with the teachings of the present invention. It is appreciated of course the transmitter and the receiver may be parts of transceivers, or transmitter-receiver combinations, at their respective locations such that bidirectional communications are provided. In the example embodiment, the transmitter includes an optical source that generates an optical communications beam, such as a laser beam or the like, on which data or information is modulated. The optical communications beam is not limited to being monochromatic or to any particular wavelength or color and may include the visible light as well as ultra violet or infra red portions of the spectrum.

In the example embodiment, the optical communications beam is directed from the transmitter to optics included in the receiver. In one embodiment, the optics direct the optical communications beam to a communications receiver circuit, which is coupled to demodulate the optical communications beam and generate a communications signal to obtain the data or information. In one embodiment, the optics also directs the optical communications beam to a tracking circuit, which is coupled to generate a tracking signal or a plurality of tracking signals. In one embodiment, the tracking circuit is also coupled to receive the communications signal from the communications receiver. In another embodiment, the tracking circuit is not coupled to receive the communications signal from the communications receiver.

In an example embodiment, the tracking circuit generates the tracking signals in response to modulation already present in the optical communications beam. In another embodiment, the tracking circuit generates the tracking signals in response to the optical communications beam and the communications signal from the communications receiver. A separate optical tracking beacon or beam in addition to the optical communications beam is not necessary in accordance with the teachings of the present invention. The tracking signal or signals are received by an alignment circuit to help keep the transmitter and receiver aligned. For instance, in one embodiment the alignment circuit is used to help control using known techniques a motor, or an actuated gimbal or the like to maintain or facilitate proper alignment of the transmitter and/or the receiver. As a result, the optical communications beam remains properly aligned or focused to help maintain uninterrupted communications.

In an example embodiment of the present invention, the communications receiver circuit includes an optical communications detector, which has relatively fast response times enabling accurate reproduction of wideband communications signals. The communications signal is generated from an output of the optical communications detector after amplification. In one embodiment, the tracking circuit includes tracking detector having a relatively wide field of view. The tracking detector includes a plurality of optical detectors such as photodiodes, a charged coupled device (CCD) or the like, to which the optical communications beam is directed. For example, in an example embodiment, a quadrant detector is utilized as the tracking detector, which includes a plurality of four optical detectors such as photodiodes. As will be appreciated, a number other than four optical detectors may be utilized in a tracking detector in accordance with the teachings of the present invention.

In the example embodiment, the four optical detectors of the quadrant detector are arranged as quadrants of a region such as a circle. By measuring the relative optical power of the illumination in each quadrant, the incident angle of an incoming optical communications beam can be determined. In one embodiment, the incoming optical communications beam is ideally aimed to be centered on the quadrant detector, equally illuminating all four quadrants, as detected by the corresponding four photodetectors. If the optical communications beam is not properly aligned between the transmitter and receiver, the incoming optical communications beam is not centered on the quadrant detector. Consequently, the four quadrants or regions of the tracking detector are not illuminated equally. The tracking signals generated by the tracking circuit and received by the alignment circuit of one embodiment of the present invention are used to control, for example, an actuated gimbal or the like, to bring the optical communications beam back into alignment.

In an example embodiment of the present invention, the effects of ambient and background light incident on the plurality of optical detectors are substantially reduced in the tracking circuit in accordance with the teachings of the present invention. The ambient and background light may originate from a number of sources including for example the sun, sky, street lights, reflections of stray light from buildings, etc. By substantially reducing these effects, background light that is not evenly distributed across all four quadrants of the quadrant detector does not result in tracking errors by the tracking circuit of one embodiment of the present invention.

FIG. 1 is a block diagram illustrating one embodiment of an optical communications system 101 in accordance with the teachings of the present invention. As shown, optical communications system 101 includes a transmitter 103 and a receiver 107. In one embodiment, transmitter 103 and receiver 107 may each be portions of respective transceivers, which provide bi-directional communications. Transmitter 103 includes an optical source 105, which generates an optical communications beam 117 on which data or information is modulated. In the illustrated embodiment, receiver 107 includes optics 109, to which optical communications beam 117 is directed. As shown, optical communications beam 117 is then directed from optics 109 to communications receiver circuit 111 as well as from optics 109 to a tracking detector included in tracking circuit 113.

In an example embodiment, optics 109 utilizes known optics elements such as any combination of a beam splitter, deflector, diffraction element, lens, holographic optics element, or the like, in accordance with the teachings of the present invention. For instance, in an example embodiment, optics 109 includes a beam splitter (not shown) to split incoming optical communications beam 117 from transmitter 103. Thus, optical communications beam 117 may be directed to both communications receiver circuit 111 and tracking circuit 113 in receiver 107. In one embodiment, communications receiver circuit 111 demodulates optical communications beam 117 to extract the data or information modulated in optical communications beam 117. In one embodiment, communications receiver circuit 111 generates a communications signal 138 that is coupled to be received by tracking circuit 113. In another embodiment, communications signal 138 is not coupled to be received by tracking circuit 113.

As will be discussed in greater detail below, a tracking detector in tracking circuit 113 receives optical communications beam 117 and tracks the alignment of optical communications beam 117 between transmitter 103 and receiver 107. In the example embodiment illustrated in FIG. 1, tracking circuit 113 generates a tracking signal or a plurality of N tracking signals 123, which is coupled to be received by alignment circuit 115. In one embodiment, tracking signals are generated in response to the optical communications beam 117. In another embodiment, tracking signals are generated in response to the optical communications beam 117 and communications signal 138.

In one embodiment, tracking signals 123 are used to indicate the alignment of optical communications beam 117 between transmitter 103 and receiver 107. In the example embodiment, alignment circuit 115 utilizes known techniques to control, for example, an actuated gimbal, motor, or the like, to adjust the orientation of optics 109 relative to optical communications beam 117 to maintain or facilitate alignment of optical communications beam 117 in response to tracking signals 123. For instance, in one embodiment, optics 109 are moved using known techniques to maintain the alignment of optical communications beam 117. In another embodiment, optical source 105 in transmitter 103 may be moved using known techniques to maintain the alignment of optical communications beam 117.

Figure 2:
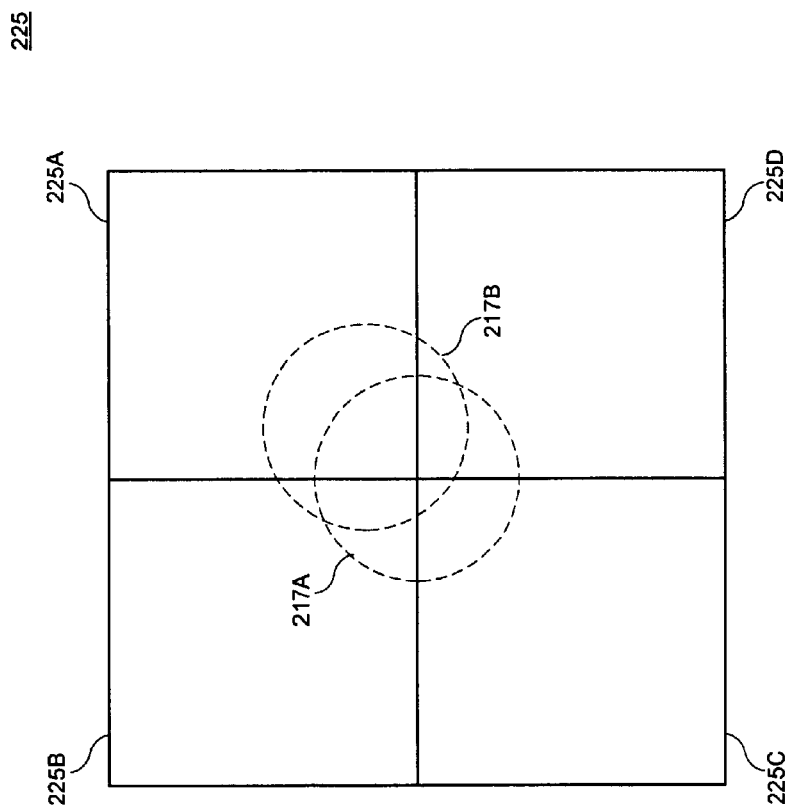
FIG. 2 is a diagram illustrating optical communications beams focused on one embodiment of a quadrant optical detector of an optical communications system in accordance with the teachings of the present invention.

To illustrate, FIG. 2 is a diagram that shows an optical communications beam focused on one embodiment of a tracking detector 225 of one embodiment of a tracking circuit in accordance with the teachings of the present invention. As illustrated, tracking detector 225 in one embodiment includes a quadrant optical detector having a plurality of four quadrants or regions 225A, 225B, 225C and 225D. It is appreciated that in other embodiments, tracking detector 225 may include more than four or less than four regions in accordance with the teachings of the present invention.

In the illustrated embodiment, spot 217A shows an area that is illuminated if optical communications beam is properly aligned. As shown, spot 217A is centered in tracking detector 225 and therefore equally illuminates all four quadrants 225A, 225B, 225C and 225D. In this situation, the tracking signals 123 in FIG. 1 would indicate to alignment circuit 115 that the optical communications beam 117 was properly aligned between transmitter 103 and receiver 107.

In contrast, spot 217B shows one example of an area that is illuminated if optical communications beam is not properly aligned. As shown, spot 217B is not centered in tracking detector 225. Consequently, the four quadrants 225A, 225B, 225C and 225D are not illuminated equally. In particular, quadrant 225A is illuminated more than quadrants 225B, 225C and 225D in the illustrated example. In this situation, the tracking signals 123 in FIG. 1 indicate to alignment circuit 115 that optical communications beam 117 is not properly aligned between transmitter 103 and receiver 107 as well as the orientation of the misalignment. In response, alignment circuit 115 in one embodiment controls an actuated gimbal, motor, or the like, to re-align optics 109 such that spot 217B is moved back towards the center of quadrant optical detector 225 to maintain proper alignment of optical communications beam 117 between transmitter 103 and receiver 107.

Figure 3:
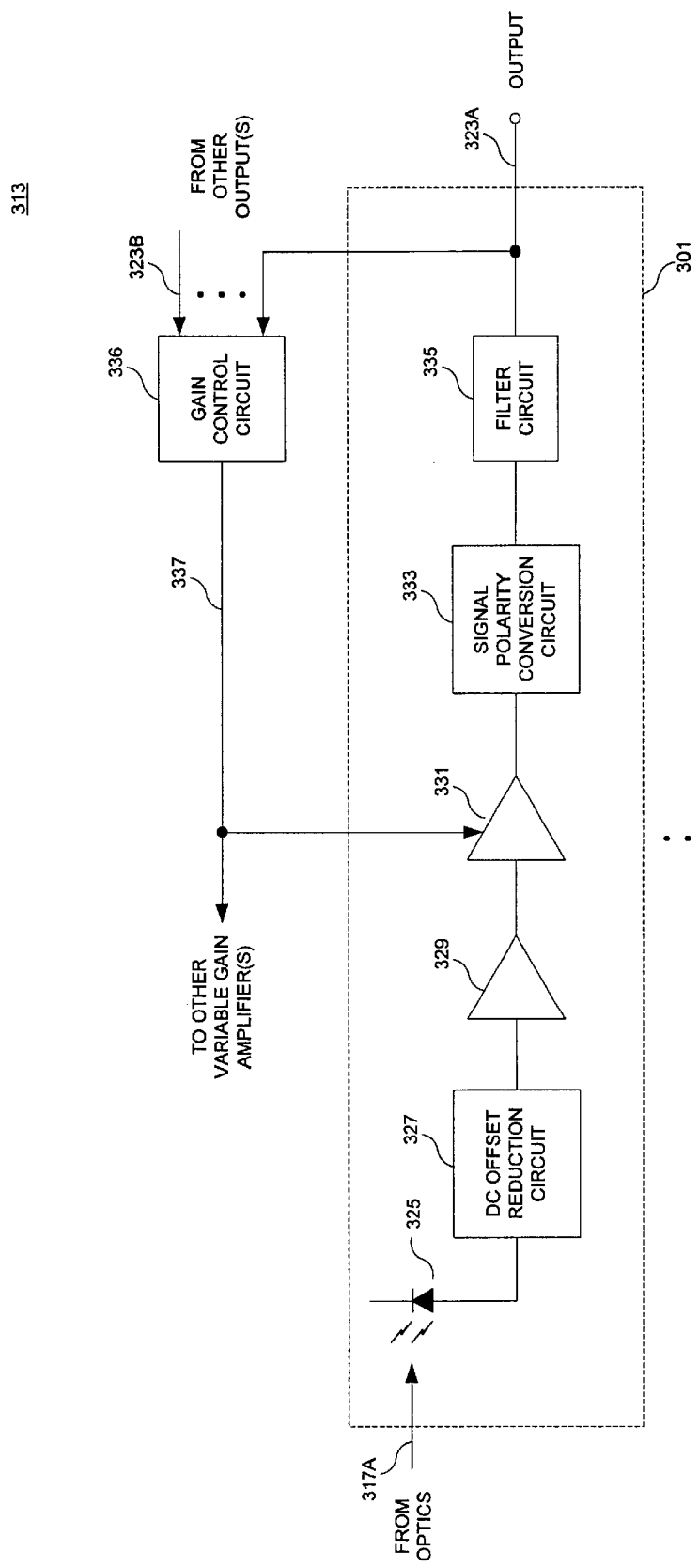
FIG. 3 is a block diagram illustrating one embodiment of a tracking channel circuit of an optical communications system in accordance with the teachings of the present invention.

FIG. 3 is a block diagram illustrating one embodiment of a tracking channel circuit 301 of a tracking circuit 313 in accordance with the teachings of the present invention. In the embodiment of FIG. 3, tracking circuit 313 is not coupled to receive communications signal 138 from communications receiver circuit 111. In one embodiment, there is a tracking channel circuit 301 for each region of the tracking detector. For instance, in the example embodiment illustrated in FIG. 2, there is a tracking channel circuit 301 corresponding to each one of the plurality of quadrants 225A, 225B, 225C and 225D of tracking detector 225. Referring back to the embodiment illustrated in FIG. 3, tracking channel circuit 301 includes an optical detector 325 optically coupled to receive optical communications beam 317A directed from optics 109. In one embodiment, optical detector 325 includes for example a photodiode, an element or pixel of CCD, or the like. In response, optical detector 325 outputs an intermediate signal.

Figure 4A:
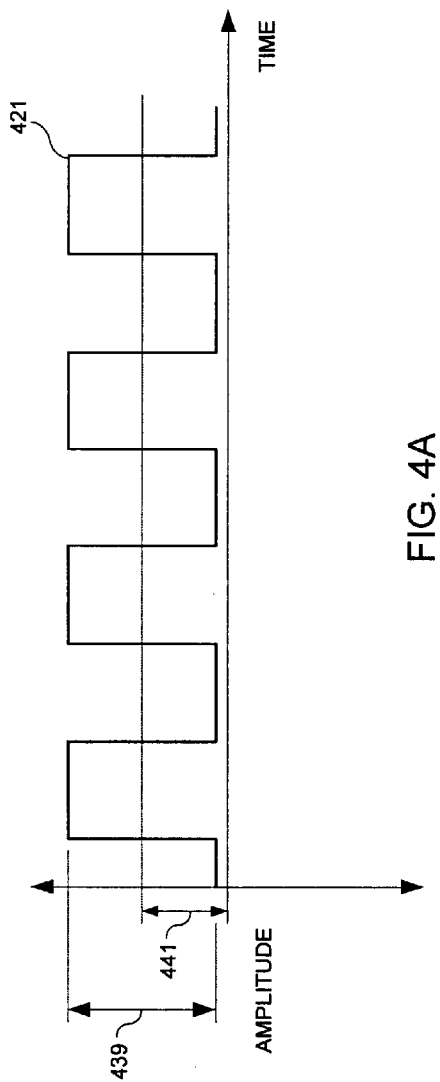
FIG. 4A is a timing diagram illustrating one embodiment of an internal signal having a direct current (DC) offset in a tracking channel circuit of an optical communications system in accordance with the teachings of the present invention.

FIG. 4A is a timing diagram illustrating one embodiment of such an intermediate signal 421 output from optical detector 325 receiving optical communications beam 317A. As shown in the depicted embodiment, signal 421 toggles between inactive and active states and has a peak-to-peak amplitude 439. As also shown, signal 421 has a direct current (DC) offset 441.

Referring back to the embodiment depicted in FIG. 3, an amplifier, such as a variable gain amplifier 331, is alternating current (AC) coupled to the output of optical detector 325 through DC offset reduction circuit 327 and amplifier 329. In one embodiment, amplifier 329 is a low-noise preamplifier and DC offset reduction circuit 327 includes a capacitor coupled between optical detector 325 and amplifier 329. In an alternate embodiment, a regular amplifier is used in place of variable gain amplifier 331 and the circuitry of tracking channel circuit 301 has a higher dynamic range than the embodiment illustrated in FIG. 3.

Figure 4B:
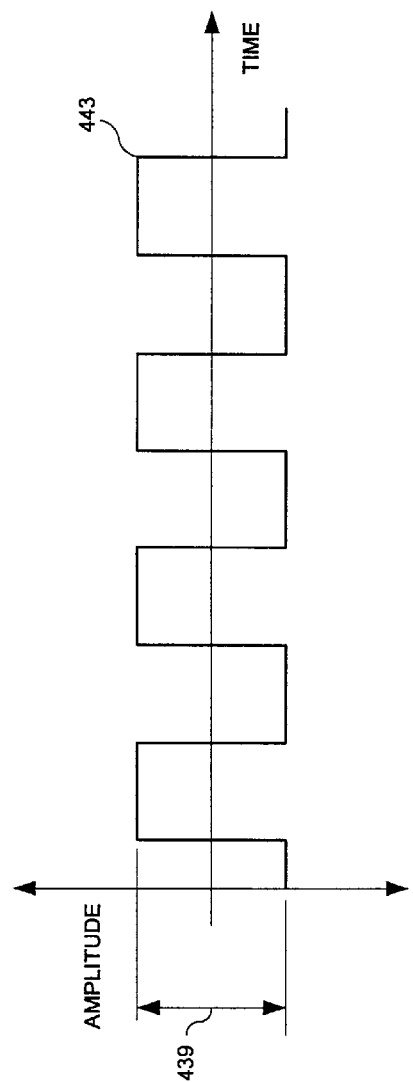
FIG. 4B is a timing diagram illustrating one embodiment of an internal signal having a DC offset substantially reduced or removed in a tracking channel circuit of an optical communications system in accordance with the teachings of the present invention.

FIG. 4B is a timing diagram illustrating one embodiment of an intermediate signal 443 output from DC offset reduction circuit 327 of FIG. 3. As shown in the depicted embodiment, signal 443 also toggles between the inactive and active states and has peak-to-peak amplitude 439. In contrast with signal 421, DC offset 441 has been substantially reduced or removed from signal 443, which results in signal 443 having approximately the same amount of positive and negaive polarity power. By substantially reducing or removing the DC offset, the effects of ambient and background light incident on optical detector 325 are substantially reduced or eliminated in accordance with the teachings of the present invention.

Referring back to FIG. 3, a signal polarity conversion circuit 333 is coupled to an output of variable gain amplifier 331. In one embodiment, signal polarity conversion circuit 333 includes a rectifier circuit, such as a full-wave rectifier or a half-wave rectifier, an absolute value circuit, a square-law circuit, which multiplies an input signal with itself, or the like. Assuming for example that signal polarity conversion circuit 333 includes a full-wave rectifier or absolute value circuit, signal 443 of FIG. 4B is converted into an all positive polarity signal or single polarity signal having a nearly DC value at an output of signal polarity conversion circuit 333. In one embodiment, filter circuit 335 is coupled to the output of signal polarity conversion circuit 333. Filter circuit 335 includes a low pass filter to help reduce or remove high frequency ripples or AC components, if any, in the output of signal polarity conversion circuit 333.

As illustrated in the example embodiment of FIG. 3, output 323A is generated at an output of filter circuit 335. Output 323A is proportional to the peak-to-peak amplitude of intermediate signals 421 or 443. In one embodiment, output 323A is one of the N plurality of tracking signals 123 output by tracking circuit 113 coupled to be received by alignment circuit 115 of FIG. 1. As shown in the example embodiment of FIG. 3, output 323A is also one of a plurality of inputs that are coupled to be received by a gain control circuit 336. For instance gain control circuit 336 is also coupled to receive an output 323B from another tracking channel circuit substantially similar to tracking channel circuit 301.

In one example embodiment, gain control circuit 336 generates a gain control signal 337 in response to the plurality of output signals received from the respective tracking channel circuits. As illustrated in the depicted embodiment, gain control signal 337 is coupled to be received by each of the variable gain amplifiers in the tracking channel circuits, including variable gain amplifier 331 of tracking channel circuit 301. Gain control signal 337 is used to control the variable gain amplifiers in each of the tracking channel circuits to help control the gain of the respective variable gain amplifiers to improve the dynamic range of intermediate signals in tracking channel circuit 301. By using the same gain control signal on all variable gain amplifiers in the respective tracking channel circuits, the relative relationship of all peak-to-peak amplitudes in the intermediate signals of the of the tracking channel circuits is preserved. Low level intermediate signals are amplified with higher gain to result in signals that are more easily measured. High level intermediate signals are amplified with lower gain to reduce signal saturation, distortion, clipping or the like. It is appreciated that in an alternate embodiment in which regular amplifiers are used instead of variable gain amplifiers in the tracking channel circuits, gain control 336 and gain control signal 337 are not included.

Figure 5:
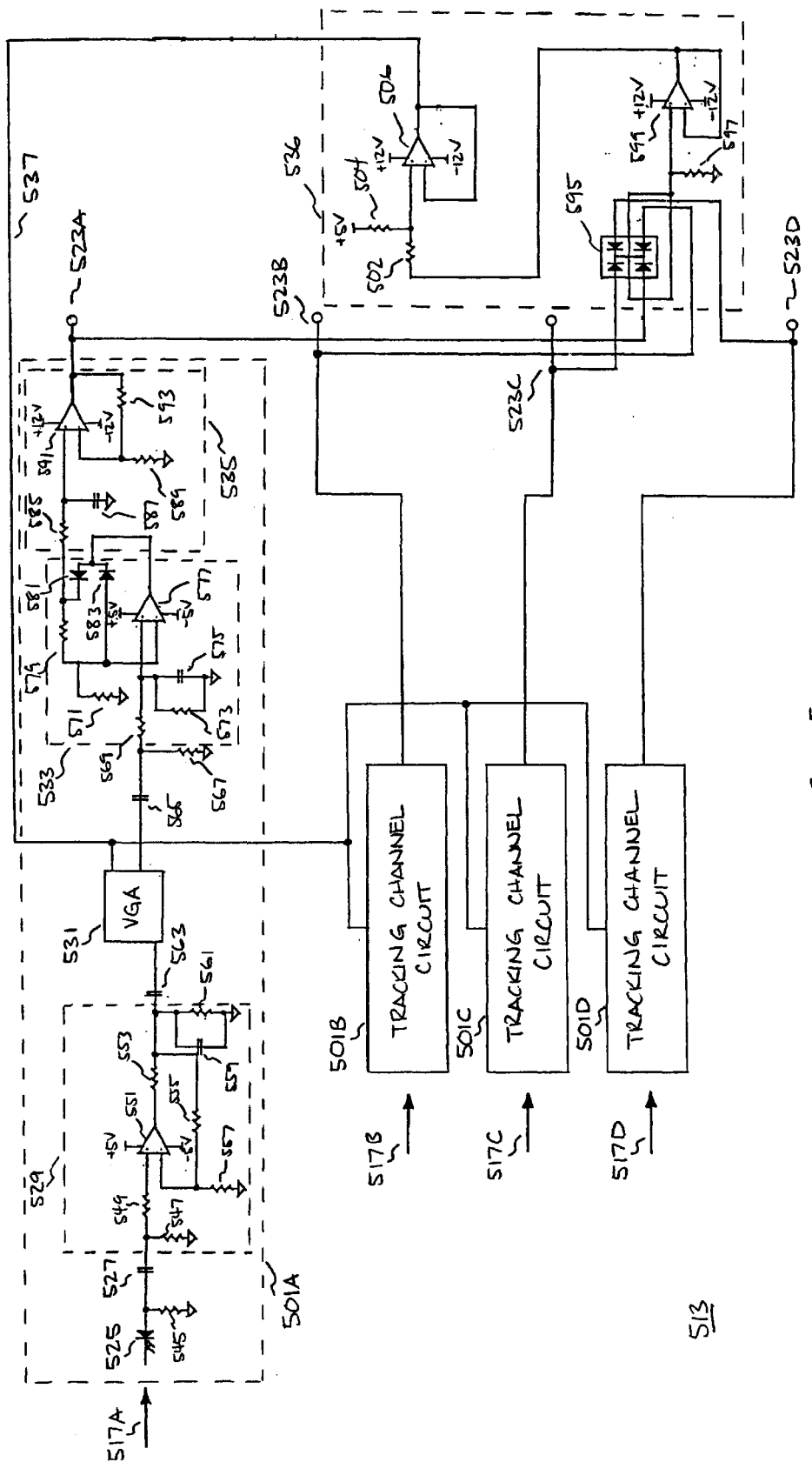
FIG. 5 is a schematic illustrating one embodiment of a tracking circuit of an optical communications system in accordance with the teachings of the present invention.

FIG. 5 is a schematic illustrating one embodiment of a tracking circuit 513 of an optical communications system in accordance with the teachings of the present invention. In the embodiment illustrated in FIG. 5, tracking circuit 513 is not coupled to receive communications signal 138 from communications receiver circuit 111. In the depicted embodiment, tracking circuit 513 includes a plurality of four tracking channel circuits 501A, 501B, 501C and 501D, which may be used in conjunction with a quadrant cell optical tracking detector, such as optical tracking detector 225 of FIG. 2. In the example embodiment illustrated, tracking channel circuits 501A, 501B, 501C and 501D are substantially similar and the detail of tracking channel circuits 501B, 501C and 501D has been omitted from FIG. 5 for the sake of clarity.

The optical communications beam, illustrated as 517A, 517B, 517C and 517D, is correspondingly directed to tracking channel circuits 501A, 501B, 501C and 501D. Output signals 523A, 523B, 523C and 523D are generated by tracking channel circuits 501A, 501B, 501C and 501D, respectively, in response to optical communications beams 517A, 517B, 517C and 517D. In one embodiment, output signals 523A, 523B, 523C and 523D are included among the tracking signals coupled to be received by the alignment circuit 115, illustrated in FIG. 1, to help maintain the alignment of transmitter 103 and receiver 107.

Referring specifically to tracking channel circuit 501A, optical communications beam 517A is directed to optical detector 525. In the example embodiment, the output of optical detector 525 is coupled to ground through resistor 545 and is AC coupled to amplifier 529 through capacitor 527. In one embodiment, capacitor 527 is a DC offset reduction circuit.

Amplifier 529 includes an amplifier 551, which is coupled between +5 and −5 volt power supply rails. A first input of amplifier 551 is coupled through a resistor 549 to capacitor 527. A resistor 547 is also coupled between resistor 549 and ground. A second input of amplifier 551 is coupled to an output of amplifier 551 through resistors 553 and 555. The second input of amplifier is also coupled to ground through resistor 557. As illustrated, a capacitor 559 and a resistor 561 are also coupled in parallel between resistor 553 and ground.

As illustrated in the example embodiment, amplifier 529 is coupled to variable gain amplifier (VGA) 531 through capacitor 563. The gain control signal 537 is coupled to be received by the VGA 531 to control the gain of VGA 531. As illustrated, gain control signal 537 is also coupled to be received by counterpart VGAs (not shown) of tracking channel circuits 517B, 517C and 517D.

In one embodiment, the output of VGA 531 is coupled through a capacitor 565 to signal polarity conversion circuit 533. In one embodiment, the input of signal polarity conversion circuit 533 is also coupled to ground through resistor 567. In the depicted embodiment, signal polarity conversion circuit 533 is a rectifier circuit that generates an all positive polarity or single polarity output signal. In particular, signal polarity conversion circuit 553 includes an amplifier 577, which is coupled between +5 and −5 volt power supply rails. A first input of amplifier 577 is coupled through resistor 569 to capacitor 565. Capacitor 573 and resistor 575 are coupled in parallel between the first input of amplifier 577 and ground. As shown, diodes 581 and 583 and resistor 579 are coupled between the output of amplifier 577 and the second input of amplifier 577. A resistor 571 is coupled between resistor 579 and ground. In the depicted embodiment, the output of signal polarity conversion circuit 533 is generated between diode 581 and resistor 579.

As shown in the example embodiment, a filter circuit 535 is coupled to the output of signal polarity conversion circuit 533. Filter circuit 535 includes amplifier 591, which is coupled between +12 and −12 volt power supply rails. A first input of amplifier 591 is coupled to the output of signal polarity conversion circuit 533 through resistor 585. The first input of amplifier 591 is also coupled through capacitor 587 to ground. The second input of amplifier 591 is coupled to the output of amplifier 591 through resistor 593. The second input of amplifier 591 is also coupled to ground through resistor 589.

In the embodiment shown, output 523A is generated at the output of filter circuit 535. In the example embodiment, tracking circuit 513 also includes gain control circuit 536, which is coupled to receive outputs 523A, 523B, 523C and 523D from tracking channel circuits 501A, 501B, 501C and 501D, respectively. In one embodiment, gain control circuit 536 includes a signal selection circuit 595, which is coupled to receive outputs 523A, 523B, 523C and 523D. Signal selection circuit 595 includes a plurality of diodes coupled to select the output 523A, 523B, 523C or 523D having the highest value. In one embodiment, the diode coupled to receive the output 523A, 523B, 523C and 523D having the highest value will conduct. The remaining diodes of signal selection circuit 595 will not conduct since these diodes will be reversed biased.

In one embodiment, the remaining circuitry of gain control circuit 536 includes interface circuitry coupled to generate gain control signal 537. For instance, in the embodiment illustrated in FIG. 5, the remaining circuitry of gain control circuit 536 is used to translate or convert the signal selected by signal selection circuit 595 to levels compatible with the respective control inputs to variable gain amplifiers of the tracking channel circuits 501A, 501B, 501C and 501D.

In the illustrated embodiment, gain control circuit 536 includes amplifiers 599 and 506. Amplifiers 599 and 506 are coupled between +12 and −12 volt power supply rails. A first input of amplifier 599 is coupled to the output of signal selection circuit 595. The first input of amplifier 599 is also coupled to ground through resistor 597. The second input of amplifier 599 is coupled to the output of amplifier 599. The first input of amplifier 506 is coupled through resistor 502 to the output of amplifier 599. The first input of amplifier 506 is also coupled to +5 volts through resistor 504. The output of amplifier 506 is coupled to the second input of amplifier 506. Gain control signal 537 is generated at the output of amplifier 506.

Referring briefly back to tracking channel circuit 301 in FIG. 3, it is noted that internal noise generated by the circuitry of tracking channel circuit 301 may be present in output 323A. For example, when there is no light received by optical detector 325 in optical communications beam 317A, there may still be some output noise generated by amplifier 329 and variable gain amplifier 331. This noise is then rectified by signal polarity conversion circuit 333, which results in a DC noise offset at output 323A, even when there is no light received by optical detector 325.

Figure 6:
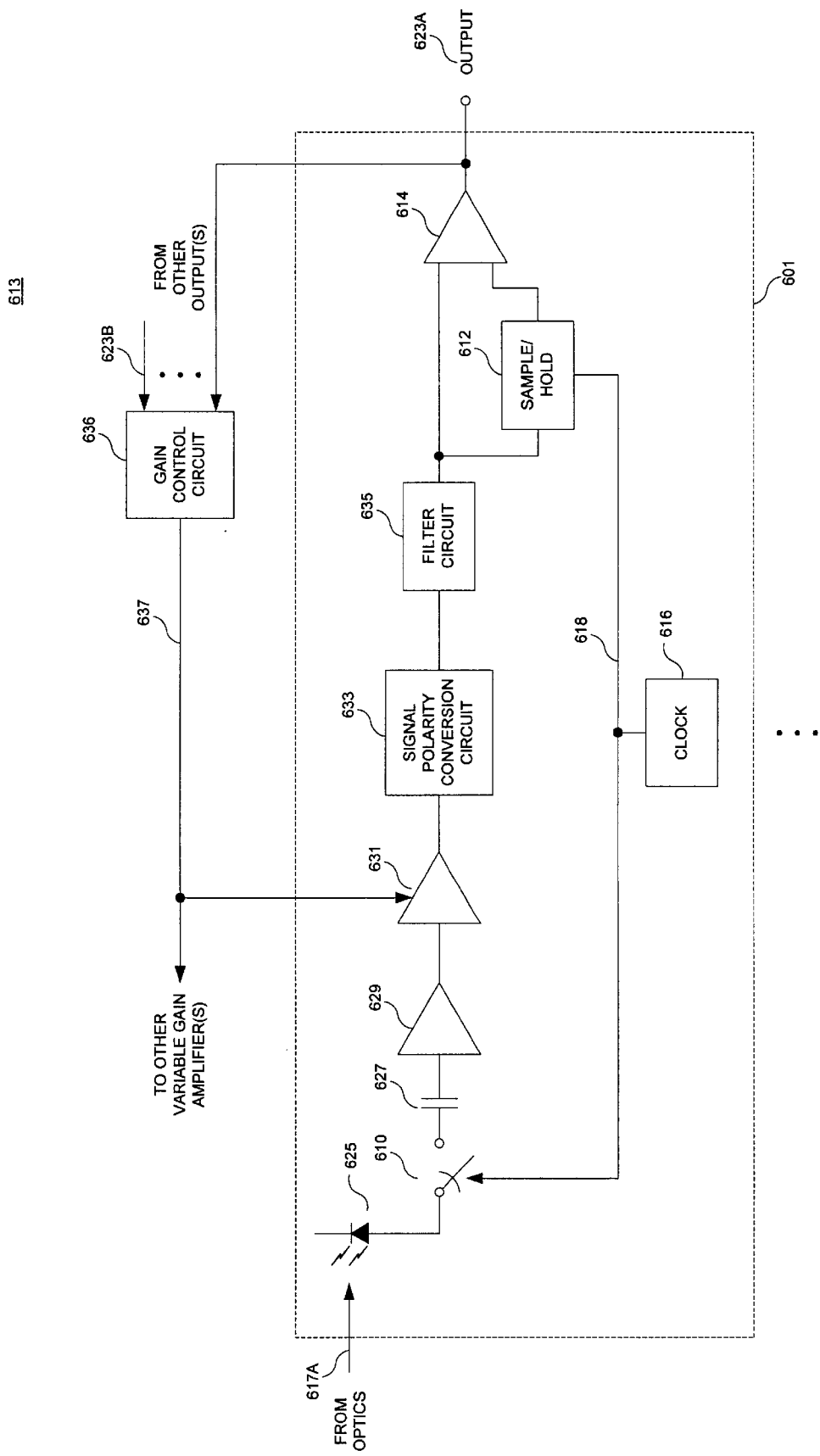
FIG. 6 is a block diagram illustrating another embodiment of a tracking channel circuit of an optical communications system in accordance with the teachings of the present invention.

To address this noise characteristic of tracking channel circuit 301, FIG. 6 is a block diagram illustrating another embodiment of tracking channel circuit 601 of a tracking circuit 613 in accordance with the teachings of one embodiment of the present mention. In the embodiment shown in FIG. 6, tracking circuit 613 is not coupled to receive communications signal 138 from communications receiver circuit 111. As shown, there is a tracking channel circuit 601 corresponding to each one of the plurality of quadrants 225A, 225B, 225C and 225D of tracking detector 225. Referring back to the embodiment illustrated in FIG. 6, tracking channel circuit 601 includes an optical detector 625 optically coupled to receive optical communications beam 617A directed from optics 109.

In one embodiment, optical detector 625 is coupled to be disabled by a clock signal 618, which is generated by clock 616. The illustration depicted in FIG. 6 illustrates optical detector 625 being disabled in response to clock signal 616 through switch 610. It is appreciated of course optical detector 625 may be disabled in a variety of other ways in accordance with the teachings of the present invention. Other ways of disabling optical detector 625 in accordance with the teachings of the present invention include for example a mechanical chopper, shutter or variable optical attenuator responsive to clock signal 618 positioned in front of optical detector 625.

A variable gain amplifier 631 is AC coupled to the output of optical detector 625 through a capacitor 627 and amplifier 629. In one embodiment, amplifier 629 is a low-noise preamplifier and capacitor 627 provides a DC offset reduction circuit. A signal polarity conversion circuit 633 is coupled to an output of variable gain amplifier 331. In one embodiment, signal polarity conversion circuit 633 includes a rectifier circuit, such as a full-wave rectifier or a half-wave rectifier, an absolute value circuit, a square-law circuit, which multiplies an input signal with itself, or the like.

Assuming for example that signal polarity conversion circuit 633 includes a full-wave rectifier or absolute value circuit, an all positive polarity signal is generated at an output of signal polarity conversion circuit 633. In one embodiment, filter circuit 635 is coupled to the output of signal polarity conversion circuit 633. Filter circuit 635 includes a low pass filter to help reduce or remove high frequency ripples or AC components, if any, in the output of signal polarity conversion circuit 633.

As illustrated in the example embodiment of FIG. 6, the output of filter circuit 635 is received at the first input of a differential amplifier 614. In addition, the output of filter circuit 635 is sampled and held with sample and hold circuit 612. The output of sample and hold circuit 612 is coupled to be received by the second input of differential amplifier 614. Sample and hold circuit 612 is coupled to sample and hold the output of filter circuit 635 in response to clock signal 618. In one embodiment, sample and hold circuit 612 is coupled to sample and hold the output of filter circuit 635 while optical detector 625 is disabled. Therefore, the output of sample and hold circuit 612 is the output of filter circuit 635 while optical detector 625 is disabled.

In one embodiment, differential amplifier 614 is coupled to generate the difference between the output of filter circuit 635 while optical detector 625 is enabled and while optical detector 625 is disabled to generate output 623A. By finding the difference between the output of filter circuit 635 while optical detector 625 is enabled and while optical detector 625 is disabled, the noise generated by amplifier 629 and variable gain amplifier 631 is substantially reduced or removed from output 623A.

Output 623A is proportional to the peak-to-peak amplitude of intermediate signals generated by optical detector 625, amplifier 629 or variable gain amplifier 631. In one embodiment, output 623A is one of the N plurality of tracking signals 123 output by tracking circuit 113 coupled to be received by alignment circuit 115 of FIG. 1. As shown in FIG. 6, output 623A is also one of a plurality of inputs that are coupled to be received a gain control circuit 636. For instance gain control circuit 636 is also coupled to receive an output 623B from another tracking channel circuit substantially similar to tracking channel circuit 601.

As also illustrated in the example embodiment illustrated in FIG. 6, gain control circuit 636 is coupled to receive a plurality of output signals from the tracking channel circuits, including output 623A and output 623B. Gain control circuit 636 is coupled to generate gain control signal 637, which is coupled to be received by the variable gain amplifiers of the tracking channel circuits, including variable gain amplifier 631 of tracking channel circuit 601.

In one example embodiment, gain control circuit 636 generates a gain control signal 637 in response to the plurality of output signals received from the respective tracking channel circuits. As illustrated in the depicted embodiment, gain control signal 637 is coupled to be received by each of the variable gain amplifiers in the tracking channel circuits, including variable gain amplifier 631 of tracking channel circuit 301. Gain control signal 637 is used to control the variable gain amplifiers in each of the tracking channel circuits to help control the gain of the respective variable gain amplifiers to improve the dynamic range of intermediate signals in tracking channel circuit 601.

Figure 7:
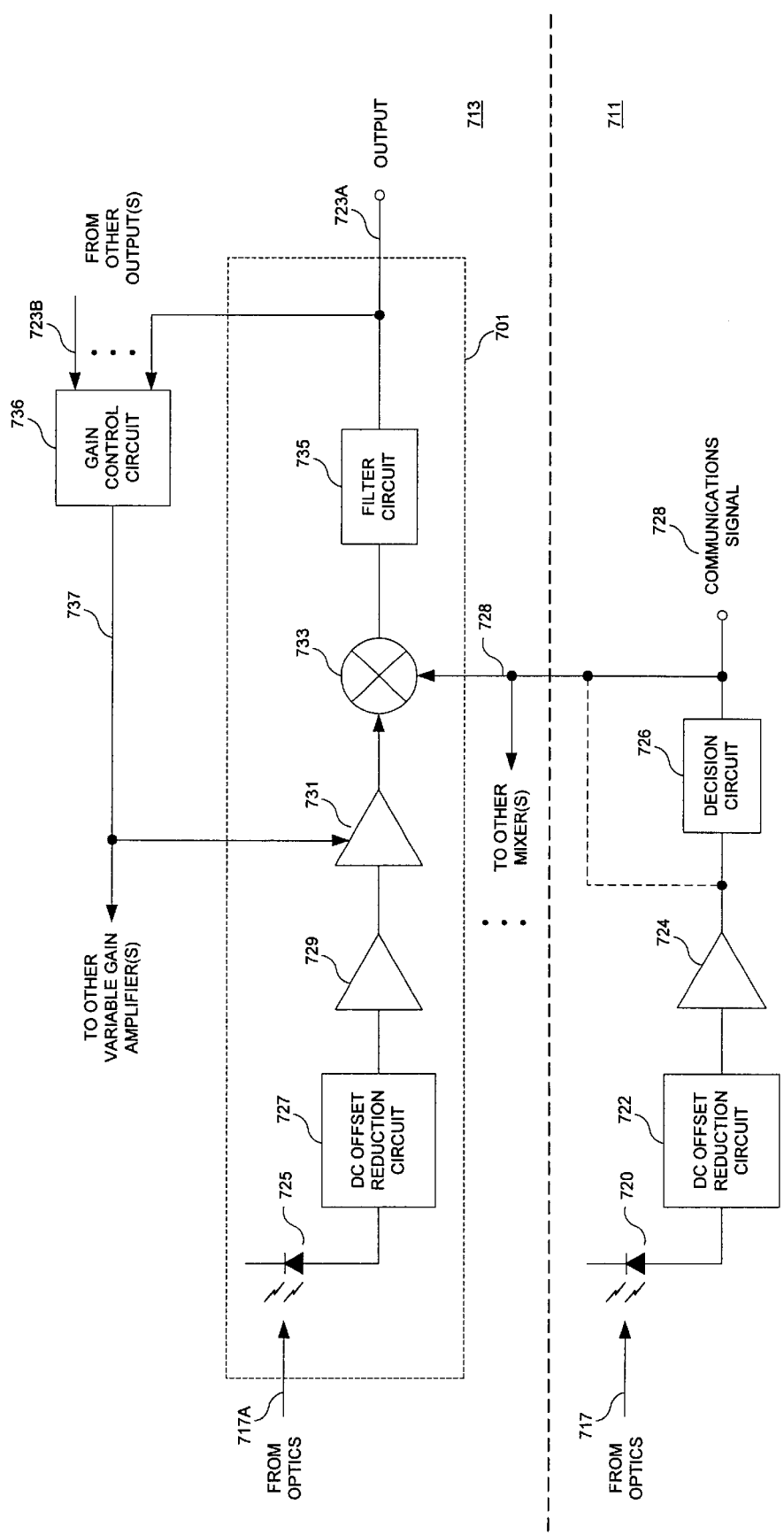
FIG. 7 is a block diagram illustrating yet another embodiment of a tracking channel circuit of an optical communications system in accordance with the teachings of the present invention.

FIG. 7 is a block diagram illustrating yet another example embodiment of portions of an optical communications system in accordance with the teachings of the present invention. As illustrated, one embodiment of a communications receiver circuit 711 is illustrated below the dashed line and one embodiment of a tracking circuit 713 is illustrated above the dashed line. In one embodiment, there is a tracking channel circuit 701 for each region of a tracking detector. For instance, in the example embodiment illustrated in FIG. 2, there is a tracking channel circuit 701 corresponding to each one of the plurality of quadrants 225A, 225B, 225C and 225D of tracking detector 225. Referring back to the embodiment illustrated in FIG. 7, tracking channel circuit 701 includes an optical detector 725 optically coupled to receive the optical communications beam, illustrated as 717A, directed from optics 109. In one embodiment, optical detector 725 includes for example a photodiode, an element or pixel of CCD, or the like. In one embodiment, the tracking detector of optical detector 725 has a relatively large field of view to enable tracking of the optical communications beam 717A over a relatively wide range of incident angles. In response, optical detector 725 outputs an intermediate signal.

FIG. 4A is a timing diagram also illustrating one embodiment of an intermediate signal 721 output from optical detector 725 receiving optical communications beam 717A. As shown in the depicted embodiment, signal 421 toggles between inactive and active states and has a peak-to-peak amplitude 439. As also shown, signal 421 has a direct current (DC) offset 441.

Referring back to the embodiment depicted in FIG. 7, an amplifier, such as a variable gain amplifier 731, is alternating current (AC) coupled to the output of optical detector 725 through DC offset reduction circuit 727 and amplifier 729. In one embodiment, amplifier 729 is a low-noise preamplifier and DC offset reduction circuit 727 includes a capacitor coupled between optical detector 725 and amplifier 729. In an alternate embodiment, a regular amplifier is used in place of variable gain amplifier 731 and the rest of the circuitry of the tracking channel circuit 701 has a higher dynamic range than the embodiment of tracking channel circuit 701 illustrated in FIG. 7.

FIG. 4B is a timing diagram also illustrating one embodiment of an intermediate signal 743 output from DC offset reduction circuit 727. As shown in the depicted embodiment, signal 443 also toggles between the inactive and active states and has peak-to-peak amplitude 439. In contrast with signal 421, DC offset 441 has been substantially reduced or removed from signal 443, which results in signal 443 having approximately the same amount of positive and negative polarity power. By substantially reducing or removing the DC offset, the effects of ambient and background light incident on optical detector 725 are substantially reduced or eliminated in accordance with the teachings of the present invention.

Referring back to FIG. 7, a mixer circuit 733 is coupled to an output of variable gain amplifier 731. Mixer circuit 733 is also coupled to receive a communications signal 728 from communications receiver circuit 711. As illustrated in the example embodiment, communications signal 728 output from communications receiver circuit 711 is coupled to be received by the mixer circuits in all of the tracking channel circuits of tracking circuit 713. In one embodiment, mixer circuit 733 includes a radio frequency (RF) mixer circuit, a multiplier circuit, or the like. In one embodiment, mixer circuit 733 includes discrete components to perform a mixing function using known techniques.

In an example embodiment, communications receiver circuit 711 includes an optical detector 720 optically coupled to receive optical communications beam, illustrated as 717, directed from optics 109. In one embodiment, optical detector 720 has relatively fast response times enabling accurate reproduction of wideband communications signals. An intermediate signal output by optical detector 720 is similar to the intermediate signal 421 output from optical detector 725, as illustrated in FIG. 4A. Referring back to FIG. 7, an amplifier 724 is AC coupled to the output of optical detector 720 through DC offset reduction circuit 722. In one embodiment, amplifier 724 is a low-noise preamplifier and DC offset reduction circuit 727 includes a capacitor coupled between optical detector 725 and amplifier 729. In one embodiment, the signal output by DC offset reduction circuit 727 is similar to the intermediate signal 443 illustrated in FIG. 4B with DC offset 441 substantially reduced or removed.

Referring back to FIG. 7, the output of amplifier 724 is communications signal 728 in one embodiment. In one embodiment, communications receiver circuit 711 includes a decision circuit 726, which is coupled to the output of amplifier 724. In one embodiment, decision circuit 726 includes known circuitry that is coupled to decide whether the output of amplifier 724 is active or inactive. For instance, if the output of amplifier 724 is active, decision circuit 726 generates an active signal. If the output of amplifier 724 is inactive, decision circuit 725 generates an inactive signal. In one embodiment, communications signal 728 is output by decision circuit 726 and is not generated at the output of amplifier 724. For the sake of brevity, it is noted that both alternative embodiments of communications signal 728 originating from either the output of amplifier 724 or communications signal 728 originating from the output of decision circuit 726 are illustrated FIG. 7. However, it will be appreciated of course that communications signal 728 does not originate simultaneously from both the output of amplifier 724 and the output of decision circuit 726.

Assuming for the purposes of explanation that mixer circuit 733 of tracking channel circuit 701 performs the function of multiplication, signal 443 of FIG. 4B is converted into an all positive or single polarity signal at an output of mixer circuit 733 having a nearly DC value. To illustrate, in one embodiment, the output of variable gain amplifier 731 is similar to communications signal 728 because both communications signal 728 and the output of variable gain amplifier 731 are generated in response to the optical communications beam. Thus, when the output of variable gain amplifier 731 is active, communications signal 728 is active. When the output of variable gain amplifier 731 is inactive, communications signal 728 is inactive. Therefore, mixer circuit 733 multiplies the output of variable gain amplifier 731 with a signal similar to the output of variable gain amplifier 731, such as communications signal 728. As can be appreciated, by multiplying a signal with itself or a signal similar to itself, a square-law function is performed which results in an all positive or single polarity signal output by mixer circuit 733.

In an example embodiment, mixer circuit 733 works with wideband input signals and is able to provide a DC coupled output signal with low output offset. It is appreciated that by mixing the output of variable gain amplifier with communications signal 728, wideband noise generated by the internal circuitry of tracking channel circuit 701, such as optical detector 725, amplifier 729 and/or variable gain amplifier 731, is substantially reduced. In particular, noise from internal circuitry of tracking channel circuit 301 is uncorrellated with noise from communications receiver circuit 311. The mixing performed by mixer circuit 733 accomplishes the result of canceling out the uncorrellated noise generated within tracking channel circuit 701 in accordance with the teachings of one embodiment of the present invention.

In the embodiment illustrated in FIG. 7, the output of mixer circuit 733 is filtered with filter circuit 735. Filter circuit 735 includes a low pass filter to help reduce or remove high frequency ripples or AC components, if any, in the output of mixer circuit 733.

As illustrated in the example embodiment of FIG. 3, output 723A is generated at an output of filter circuit 735. Output 723A is proportional to the peak-to-peak amplitude intermediate signals in tracking channel circuit 701. In one embodiment, output 723A is one of the N plurality of tracking signals 123 output by tracking circuit 113 coupled to be received by alignment circuit 115 of FIG. 1. As shown in the example of FIG. 7, output 723A is also one of a plurality of inputs that are coupled to be received by a gain control circuit 736. For instance, gain control circuit 736 is also coupled to receive an output 723B from another tracking channel circuit substantially similar to tracking channel circuit 701.

In one example embodiment, gain control circuit 736 generates a gain control signal 737 in response to the plurality of output signals received from the respective tracking channel circuits. As illustrated in the depicted embodiment, gain control signal 737 is coupled to be received by each of the variable gain amplifiers in the tracking channel circuits, including variable gain amplifier 731 of tracking channel circuit 701. Gain control signal 737 is used to control the variable gain amplifiers in each of the tracking channel circuits to help control the gain of the respective variable gain amplifiers to improve the dynamic range of intermediate signals in tracking channel circuit 701. By using the same gain control signal on all variable gain amplifiers in the respective tracking channel circuits, the relative relationship of all peak-to-peak amplitudes in the intermediate signals of the tracking channel circuits is preserved. Low level intermediate signals are amplified with higher gain to result in signals that are more easily measured. High level intermediate signals are amplified with lower gain to reduce signal saturation, distortion, clipping or the like. It is appreciated that in an alternate embodiment in which regular amplifiers are used instead of variable gain amplifiers in the tracking channel circuits, gain control 736 and gain control signal 737 are not included.

In the foregoing detailed description, the method and apparatus of the present invention have been described with reference to specific exemplary embodiments thereof. It will, however, be evident that various modifications and changes may be made thereto without departing from the broader spirit and scope of the present invention. The present specification and figures are accordingly to be regarded as illustrative rather than restrictive.

What is claimed is:

1. An apparatus, comprising:
   an optical detector optically coupled to receive the optical communications beam directed from optics;
   an amplifier alternating current (AC) coupled to the optical detector; and
   a mixer circuit coupled to receive an output of the amplifier and a communications signal generated by a communications receiver circuit in response to the optical communications beam, the mixer circuit coupled to generate a first single polarity output signal in response to an output of the amplifier and the communications signal to facilitate aligned reception of the optical communications beam by the optics.

2. The apparatus of claim 1 wherein the optical detector is one of a plurality of optical tracking detectors optically coupled to receive the optical communications beam.

3. The apparatus of claim 2 wherein the amplifier is one of a plurality of amplifiers, each one of the plurality of amplifiers AC coupled to a respective one of the plurality of optical tracking detectors.

4. The apparatus of claim 3 further comprising a plurality of direct current (DC) offset reduction circuits, each one of the plurality of DC offset reduction circuits coupled between a respective one of the plurality of optical tracking detectors and a respective one of the plurality of amplifiers.

5. The apparatus of claim 4 wherein each one of the plurality of DC offset reduction circuits comprises a capacitor coupled between the respective one of the plurality of optical tracking detectors and the respective one of the plurality of amplifiers.

6. The apparatus of claim 3 wherein the mixer is one of a plurality of mixers, each one of the plurality of mixers coupled to receive an output of a respective one of the plurality of amplifiers, each one of the mixers coupled to receive the communications signal, each one of the plurality of mixers coupled to generate a respective one of a plurality of single polarity output signals including the first single polarity output signal.

7. The apparatus of claim 6 wherein each of the plurality of single polarity output signals is coupled to be received by an alignment circuit.

8. The apparatus of claim 6 wherein each of the plurality of mixers comprises a radio frequency (RF) mixer integrated circuit.

9. The apparatus of claim 6 wherein each of the plurality of mixers comprises a multiplier circuit.

10. The apparatus of claim 6 wherein each of the plurality of amplifiers is a variable gain amplifier, the apparatus further comprising a gain control circuit coupled to receive the plurality of single polarity output signals and coupled to generate a gain control signal coupled to be received by each of the plurality of variable gain amplifiers.

11. The apparatus of claim 10 wherein the apparatus further comprises a plurality of filter circuits, each of the plurality of filter circuits coupled between the gain control circuit and a respective one of the plurality of mixers.

12. The apparatus of claim 1 wherein the optical detector comprises a photodiode.

13. The apparatus of claim 1 wherein the optical detector comprises a charge coupled device (CCD).

14. The apparatus of claim 1 wherein the communications receiver circuit comprises:
   an optical communications detector optically coupled to receive the optical communications beam; and
   a communications amplifier AC coupled to the optical communications detector, the communications signal generated in response to the communications amplifier.

15. The apparatus of claim 14 further comprising a decision circuit coupled to an output of the communications amplifier, the communications signal generated in response to the decision circuit.

16. A method, comprising:
   receiving an optical communications beam with a communications receiver circuit;
   generating a communications signal in response to the optical communications beam;
   receiving the optical communications beam with a tracking circuit;
   generating a first internal signal in the tracking circuit in response to the optical communications beam wherein generating the first internal signal in the tracking circuit in response to the optical communications beam comprises receiving the optical communications beam with an optical tracking detector and substantially reducing a direct current (DC) component of an output of the optical tracking detector; and
   mixing the communications signal with the first internal signal in the tracking circuit to generate a first tracking signal to facilitate aligned reception of the optical communications beam.

17. The method of claim 16 further comprising:
   generating a plurality of internal signals, including generating the first internal signal, in the tracking circuit in response to the optical communications beam; and
   mixing the communications signal with each one of the plurality of internal signals, including mixing the communications signal with the first internal signal, in the tracking circuit to generate a plurality of tracking signals, including the first tracking signal.

18. The method of claim 16 further comprising filtering the first tracking signal.

19. The method of claim 16 wherein mixing the communications signal with the first internal signal comprises multiplying the communications signal with the first internal signal.

20. The method of claim 16 further comprising amplifying the output of the optical tracking detector.

21. The method of claim 16 wherein generating the communications signal in response to the optical communications beam comprises:
    receiving the optical communications beam with an optical communications detector; and
    substantially reducing a direct current (DC) component of an output of the optical communications detector.

22. The method of claim 21 further comprising amplifying the output of the optical communications detector.

23. The method of claim 22 wherein generating the communications signal comprises making a decision of whether the communications signal is active or inactive.

24. An optical system, comprising:
    optics optically coupled to receive an optical communications beam;
    a communications receiver circuit optically coupled to the optics to receive the optical communications beam, the communications circuit to generate a communications signal in response to the optical communications beam; and
    a tracking circuit including a plurality of tracking channel circuits, each of the plurality of tracking channel circuits optically coupled to the optics to receive the optical communications beam, each of the plurality of tracking channel circuits coupled to receive the communications signal, each of the plurality of tracking channel circuits coupled to generate a respective tracking signal in response to the communications signal and the optical communications beam to facilitate aligned reception of the optical communications beam by the optics, wherein each one of the plurality of tracking channel circuits comprises:
        an optical tracking detector optically coupled to the optics to receive the optical communications beam,
        an amplifier alternating current (AC) coupled to an output of the optical tracking detector; and
        a mixer coupled to an output of the amplifier and coupled to receive the communications signal, the mixer to generate the respective tracking signal, and
        a direct current (DC) offset reduction circuit coupled between the optical tracking detector and the amplifier.

25. The optical system of claim 24 further comprising an alignment circuit coupled to receive the respective tracking signal from each one of the plurality of tracking channel circuits.

26. The optical system of claim 24 wherein the mixer comprises a multiplier circuit.

27. The optical system of claim 24 wherein the communications receiver circuit comprises:
    an optical communications detector optically coupled to the optics to receive the optical communications beam; and
    an amplifier alternating current (AC) coupled to an output of the optical tracking detector.

28. The optical system of claim 27 wherein the communications receiver circuit further comprises a decision circuit coupled to an output of the amplifier.

29. A method, comprising:
    receiving an optical communications beam with a communications receiver circuit;
    generating a communications signal in response to the optical communications beam;
    receiving the optical communications beam with a tracking circuit;
    generating a first internal signal in the tracking circuit in response to the optical communications beam; and
    mixing the communications signal with the first internal signal in the tracking circuit to generate a first single polarity tracking signal to facilitate aligned reception of the optical communications beam.

30. The method of claim 29 further comprising:
    generating a plurality of internal signals, including generating the first internal signal, in the tracking circuit in response to the optical communications beam; and
    mixing the communications signal with each one of the plurality of internal signals, including mixing the communications signal with the first internal signal, in the tracking circuit to generate a plurality of tracking signals, including the first tracking signal.

31. The method of claim 29 further comprising filtering the first tracking signal.

32. The method of claim 29 wherein mixing the communications signal with the first internal signal comprises multiplying the communications signal with the first internal signal.

33. The method of claim 29 wherein generating the first internal signal in the tracking circuit in response to the optical communications beam comprises:
    receiving the optical communications beam with an optical tracking detector; and
    substantially reducing a direct current (DC) component of an output of the optical tracking detector.

34. The method of claim 33 further comprising amplifying the output of the optical tracking detector.

35. The method of claim 27 wherein generating the communications signal in response to the optical communications beam comprises:
    receiving the optical communications beam with an optical communications detector; and
    substantially reducing a direct current (DC) component of an output of the optical communications detector.

36. The method of claim 35 further comprising amplifying the output of the optical communications detector.

37. The method of claim 36 wherein generating the communications signal comprises making a decision of whether the communications signal is active or inactive.

38. A optical system, comprising:
    optics optically coupled to receive an optical communications beam;
    a communications receiver circuit optically coupled to the optics to receive the optical communications beam, the communications circuit to generate a communications signal in response to the optical communications beam; and
    a tracking circuit including a plurality of tracking channel circuits, each of the plurality of tracking channel circuits optically coupled to the optics to receive the optical communications beam, each of the plurality of tracking channel circuits coupled to receive the communications signal, each of the plurality of tracking channel circuits coupled to generate a respective single polarity tracking signal in response to the communications signal and the optical communications beam to facilitate aligned reception of the optical communications beam by the optics.

39. The optical system of claim 38 further comprising an alignment circuit coupled to receive the respective tracking signal from each one of the plurality of tracking channel circuits.

40. The optical system of claim 38 wherein each one of the plurality of tracking channel circuits comprises:

an optical tracking detector optically coupled to the optics to receive the optical communications beam;

an amplifier alternating current (AC) coupled to an output of the optical tracking detector; and a mixer coupled to an output of the amplifier and coupled to receive the communications signal, the mixer to generate the respective tracking signal.

41. The optical system of claim 40 wherein each one of the plurality of tracking channel circuits further comprises a direct current (DC) offset reduction circuit coupled between the optical tracking detector and the amplifier.

42. The optical system of claim 40 wherein the mixer comprises a multiplier circuit.

43. The optical system of claim 38 wherein the communications receiver circuit comprises:

an optical communications detector optically coupled to the optics to receive the optical communications beam; and an amplifier alternating current (AC) coupled to an output of the optical tracking detector.

44. The optical system of claim 43 wherein the communications receiver circuit further comprises a decision circuit coupled to an output of the amplifier.

* * * * *